United States Patent [19]

Cole

[11] 4,323,888

[45] Apr. 6, 1982

[54] KEYBOARD SYSTEM WITH VARIABLE AUTOMATIC REPEAT CAPABILITY

[75] Inventor: James A. Cole, East Setauket, N.Y.

[73] Assignee: Megadata Corporation, Bohemia, N.Y.

[21] Appl. No.: 106,362

[22] Filed: Dec. 21, 1979

[51] Int. Cl.$^3$ .............................................. G06F 3/02
[52] U.S. Cl. ............................... 340/365 A; 310/319; 340/365 S; 400/368; 400/479
[58] Field of Search ........... 340/365 R, 365 S, 365 A; 400/477, 479, 368, 369; 178/17 C; 179/90 K; 310/314, 319

[56] References Cited

U.S. PATENT DOCUMENTS

| | | | |
|---|---|---|---|
| 3,436,735 | 4/1969 | Hoiseth | 340/365 S |
| 3,781,874 | 12/1973 | Jennings | 340/365S |
| 4,020,391 | 4/1977 | Baxter | 340/365 S |
| 4,106,011 | 8/1978 | Melanson et al. | 340/365 S |

OTHER PUBLICATIONS

*IBM Technical Disclosure Bulletin,* Harrod, vol. 20, No. 10, Mar. 1978, pp. 4039–4040.
*IBM Technical Disclosure Bulletin,* Dahl, vol. 20, No. 1, Jun. 1977, pp. 315–316.

Primary Examiner—James J. Groody
Attorney, Agent, or Firm—Hopgood, Calimafde, Kalil, Blaustein & Judlowe

[57] ABSTRACT

A keyboard system having a plurality of actuable keys is coupled through a central processing unit to an indicia accessing unit for accessing indicia corresponding to said keys. An automatic repeat circuit also interconnects the keyboard system with the central processing unit and includes pressure transducer means responsive to actuating pressure on said keys for producing an amplitude variable signal which causes a signal convertor to produce a corresponding rate variable signal which when fed to the central processing unit causes repetitive accessing of the corresponding indicia at a selectable rate. Feedback from the central processing unit to the repeat circuit determines which key signals are to be operative for repetitive indicia access.

8 Claims, 5 Drawing Figures

KEYBOARD SYSTEM WITH VARIABLE AUTOMATIC REPEAT CAPABILITY

BACKGROUND OF THE INVENTION

This invention pertains to keyboards and, in particular, to keyboards for accessing or actuating indicia associated with the keyboard keys.

Keyboards are used in numerous applications for accessing or actuating representations or indicia associated with the keyboards keys. Thus, for example, in typewriters of the mechanical or electrical type, the typewriter keys enable mechanical and electrical actuation, respectively, of printing heads carrying alphaneumeric indicia associated with the keys. Analagously, in computer video terminals, computer teleprinters and electronic calculators, keyboard keys enable accessing of related indicia for display and other purposes.

During the use of a keyboard it is often necessary to repeatedly access the same indicium, thereby requiring repeated striking of the corresponding keyboard key. This occurs, for example, if printing or displaying of a word having repeated letters, such as, e.g., the word root, is required. It also occurs when a lengthy passage is to be underlined or underscored as might happen when using a typewriter. Continued movement of a cursor on a computer video terminal also requires a similar repetitive key striking.

In order to avoid multiple striking of the same key, keyboard systems have been developed which possess what is commonly referred to as an "automatic repeat capability." Such a capability enables continuous accessing of an indicium without multiple key striking. In one form, this capability is provided by holding a key in the struck position until the corresponding indicium is accessed the desired number of times. In another form, a separate so called "repeat key" is provided. When multiple access is desired, the latter key is depressed along with the key whose indicium is desired, and as long as both keys are depressed the desired indicium is repeatedly accessed.

A further improvement over the aforesaid automatic repeat keyboard systems is one having variable speed operation. With this type of automatic repeat, accessing of the indicium corresponding to a struck key can be rapid or slow at the operator's option. Thus, if only a few repetitions are required slow repeat can be selected to enable the operator to release the struck key when the required number of the repetitions has occurred. On the other hand, if a large number of repetitions are required, initial repeat can be at a rapid pace and the pace thereafter slowed so as to again permit accurate release of the struck key when the desired number of repetitions has occurred.

To date, variable automatic repeats for keyboard operation have been limited to the use of mechanically operated actuators for realizing the variable repeat function. Thus, a variety of graphics terminals are equipped with so called "joy sticks" or "track balls" for obtaining variable automatic repeat. In these instances, mechanical movement of the respective element is used to generate an electrical signal which varies with the degree of movement. This variable signal is then used to correspondingly vary the repeat function. Another form of variable automatic repeat utilizes a separate keyboard key which upon being held in the struck position varies the repeat rate of the indicium already undergoing repetition.

The aforesaid variable automatic repeats have certain detracting qualities. Thus, the joy stick and track ball require continued mechanical movement, and, therefore, are susceptible to costly mechanical breakdowns. Moreover, they require two handed operation. The use of these devices has thus been confined primarily to cursor positioning, i.e., to movement of an indicator showing where the next accessed indicium is to be placed. Similar deficiences are attendant the separate key variable automatic repeat. The latter repeat also suffers the disadvantage of being incapable of continuous variation in repetition rate. Only two discrete operating rates, one fast and the other slow, are possible.

It is therefore a primary object of the present invention to provide an improved keyboard system.

It is a further object of the present invention to provide a keyboard system having an electronically actuated variable automatic repeat requiring only single handed operation.

SUMMARY OF THE INVENTION

In accordance with the principles of the present invention, the above and other objectives are realized in a keyboard system provided with a number of actuatable keys for accessing corresponding indicia and with automatic repeat means responsive to the actuating pressure or force applied to the keys for generating a repeat signal variable with the actuating pressure. The latter signal is applied to an indicia accessing system which is also responsive to actuation or striking of the keyboard keys and which responds to the signal in the same manner as a struck key.

In this fashion, initial striking of a key causes the accessing system to access the indicium of the struck key, while continued application of actuating pressure to the key results in the generation of the repeat signal. The latter signal causes the accessing system to repeat accessing of the indicium of the struck key in accordance with the signal variation. Since the signal varies with actuating pressure, the rate of repeated indicia accessing similarly varies with actuating pressure and can be increased or decreased as desired by varying such pressure. Continuous and variable repetitive accessing of the struck key indicium is thus realized through the application of variable actuating pressure and without the need to strike a further key. A keyboard system with a reliable, relatively simple and inexpensive variable automatic repeat thereby results.

In the embodiment of the invention to be described hereinbelow, the automatic repeat means comprises one or more transducers positioned between the keyboard base and the support member or frame for the keyboard keys. The outputs of these transducers are coupled to a converter circuit which provides an output digital signal whose rate of state change corresponds to the combined transducer outputs and, therefore, to the actuating pressure applied to a struck key. This digital signal serves as the repeat signal and is applied to the indicia accessing system causing same to access the indicium of the struck key at the signal rate which can be varied by variation of the actuation pressure applied to the struck key.

DETAILED DESCRIPTION

Figure 1:
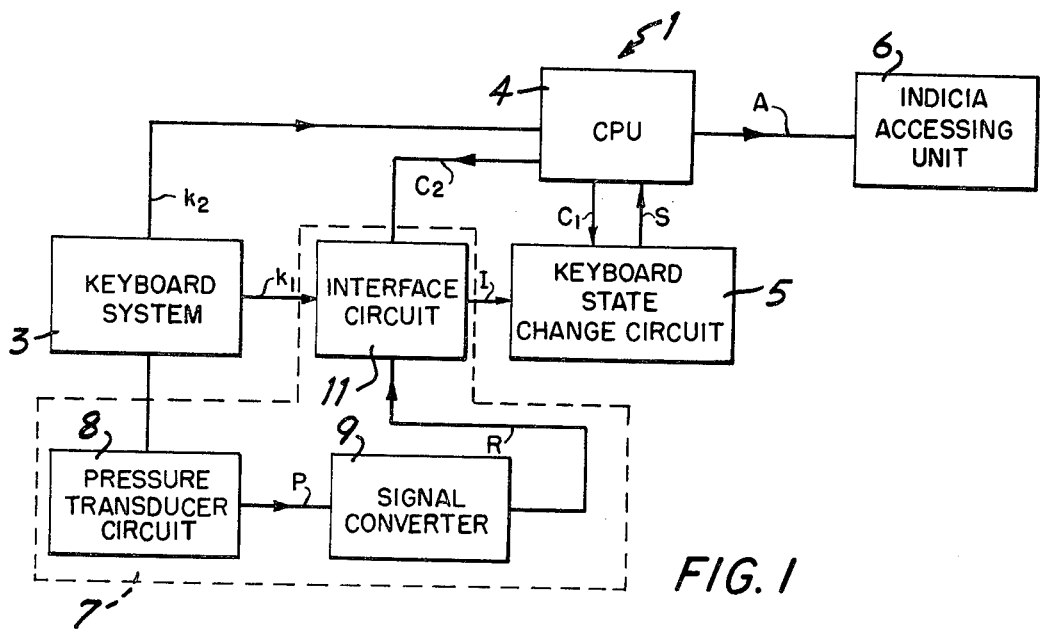
FIG. 1 illustrates in block diagram form an indicia accessing system employing a keyboard system in accordance with the principles of the present invention.

FIG. 1 shows in block diagram form a system 1 for accessing indicia corresponding to the keys of a keyboard system 3 which developes output signals $k_1$ and $k_2$. The signal $k_2$ is coupled directly to a central processing unit (CPU) 4, while the signal $k_1$ is utilized to influence a keyboard state change circuit 5 whose output S is also made available to the CPU 4. The CPU 4 directs the operation of an indicia accessing unit 6 which accesses indicia corresponding to the keys of the keyboard system 3.

In typical operation, the actuation or striking of a key of the keyboard system 3 causes the output signal $k_2$ to comprise a coded digital signal whose code corresponds to the struck key. Simultaneously, the signal $k_1$ undergoes first direction state transition (for the purposes of discussion first direction state transition is used herein to mean a transition from low to high) indicating that a key of the keyboard system 3 has been struck. This change in state of the signal $k_1$ causes a corresponding first direction state transition (transition from low to high) in the signal S, the latter signal also being applied to the CPU 4.

The CPU 4 periodically interrogates the applied signal S and upon detection of a first state (assumed for the purposes of discussion to be high) for the signal recognizes that a key of the keyboard system 3 has been struck, and that the CPU should proceed to its read and access phase of operation. In this phase of operation, the CPU 4 reads the code of the applied signal $k_2$ and based thereon generates an accessing signal A which instructs the unit 6 to access the indicium corresponding to the read code and, hence, to the struck key. After the indicium has been accessed, the CPU 4, via the signal $C_1$, causes the circuit 5 to return the signal S to its original state (in the assumed present case, to its low state) in preparation for further striking of keys and accessing of indicia corresponding thereto.

As above-described, the aforesaid operation of the system 1 is standard and is followed by conventional indicia accessing systems. Thus, for example, the electronic indicia accessing system manufactured by Megadata Corporation under Model No. 700 operates in this manner.

In accordance with the principles of the present invention, the system 1 is further provided with an automatic repeat circuit 7 for enabling repetitive accessing of the indicium corresponding to a struck key at a controllable variable repetition rate. The circuit 7 comprises a pressure transducer circuit 8 which is responsive to the actuating force or pressure applied to each of the keys of the keyboard system 3 and which generates an analog signal P whose amplitude corresponds to the amplitude of the applied pressure. The analog signal P is coupled to a signal converter 9 which converts the analog signal to a repeat signal R having repetitive first direction state transition (transition from low to high) at a rate r corresponding to the amplitude of the analog signal and, hence, to the applied pressure. The repeat signal R is applied to an interface circuit 11 which also receives the signal $k_1$ from the keyboard system 3 and a further signal $C_2$ from the CPU 4 and which develops an output signal I for controlling the state of the keyboard state change circuit output signal S.

The interface circuit 11 responds to state transitions of the signals $k_1$ and R in an analogous manner and is adapted to provide a pulse output of one state (assumed for the purposes of discussion to be low) for its signal I for first direction state transitions (transitions from low to high) of each of the two signals. With respect to the signal R, the circuit 11 is further adapted to respond only to first direction state transitions occurring after the lapse of a predetermined interval of time from the striking of a key. The keyboard state change circuit 5, upon receipt of each pulse of the signal I is adapted to undergo first direction state transition (from low to high) in its output signal S.

With the automatic repeat circuit 7 included in the system 1, the system initially operates as described hereinabove. Thus, upon the striking of a key of the keyboard system 3 the signal $k_1$ undergoes first direction state transition (low to high) causing a pulse of the interface output signal I and thereupon a first direction state transition (low to high) of the signal S. This state transition results in a first state (high) for the signal S which is detected by the CPU 4 during its periodic interrogation causing the CPU 4 to read the code carried by the signal $k_2$ generated upon striking of the keyboard key. The CPU 4 then instructs the accessing unit 6 to access the indicium corresponding to the read code and, hence, the struck key and thereafter returns the signal S to its original state (its low state).

In this case, however, the pressure applied to the struck key also causes the transducer circuit 8 to generate the output signal P, the signal P being then transformed by the converter 9 into the repeat signal R having repetitive first direction state transition (low to high) at the rate r. The repeat signal R upon application to the interface circuit 11 causes further pulse outputs to occur in the signal I at the rate r.

Each of these further pulses of the signal I affects the keyboard state change circuit 5 and CPU 4 in an analagous manner as the initial pulse resulting from the change in state of the signal $k_1$. Thus, each pulse causes first direction state transition of the signal S of the circuit 5, this state transition being detected by the periodic interrogating of the CPU 4. The CPU 4, in turn, again reads the code carried by the signal $k_2$, which signal remains present due to the continued maintenance of the struck key in that condition. Upon reading this code, the CPU instructs the accessing unit 6 to again access the indicium corresponding to the struck key and thereafter again return the signal S to its original (low) state.

The automatic repeat circuit 7 thus results in a repetition of the initial accessing of the struck key indicium brought about by striking the key and changing the state of the signal $k_1$. This repetitive accessing is at the rate r of the pulses of the signal I and is initiated when the actuating pressure on the struck key is maintained beyond the aforementioned predetermined time interval. It continues until the struck key is released, thereby reducing the pressure on the keyboard system below the level required to obtain a discernible output from the transducer circuit 8. At this pressure level, the transducer signal P and the repeat signal R approach minimum substantially constant levels and no first direction state transitions are produced at the interface circuit 11. The interface circuit output signal I therefore exhibits no further pulses and the circuit 5 output signal S remains at its last state (low) set by the CPU 4 during the last accessing operation. Periodic interrogation of the signal S by the CPU 4 detects this state of the circuit 5 indicating no accessing operation is to be carried out. Only when another key is struck will accessing of the corresponding indicium again occur and only when the struck key is held under pressure in the struck condition beyond the predetermined time interval will the indicium be repeatedly accessed.

As above indicated, repeated accessing of an indicium occurs at the repetition rate r of the pulses of the signal I. The rate r, in turn, is dependent upon the pressure being applied to the struck key. By controllably varying this pressure a controllable variation in the accessing rate is thereby realizable in a simple and reliable manner. Thus, by merely increasing or decreasing the pressure on the struck key, the transducer 8 and converter 9 increase or decrease the rate r and thereby the rate of accessing of the indicium of the struck key. Hence, with the present automatic repeat circuit variable accessing is realizable with single handed operation and through reliable electronic circuitry.

As mentioned above, the interface circuit 11, in addition to the signals $k_1$ and R, is responsive to the signal $C_2$ from the CPU 4. The signal $C_2$ permits control of the interface circuit 11 so that repetitive accessing occurs for only preselected ones of the keyboard keys. In particular, the CPU 4 generates the signal $C_2$ during the initial reading and accessing operation resulting from the change in state of the signal $k_1$. When the code of the signal $k_2$ is read during this initial operation, the CPU 4, in addition to generating the corresponding accessing signal compares the read code to reference codes indicative of keyboard keys for which repetitive accessing is to be permitted if desired. If the read code is the same as one of the reference codes, the CPU 4 causes the signal $C_2$ to have a first state (assumed to be high) which sets the interface circuit 11 so as to be able to respond to the repeat signal R. If repetitive accessing is to occur for all keys of the keyboard system 3, the aforesaid comparison process by the CPU 4 can be dispensed with and the signal $C_2$ can be continuously maintained in its first state (high) so as to continuously enable the interface circuit to respond to the signal R.

As above described, interface circuit 11 is adapted to respond only to first direction state transitions occurring a predetermined time interval t after the striking of a key. This delay permits the slow striking of a key from being confused with a desire to obtain repetitive accessing and should be selected to be longer than the reasonably expected slowest striking time. Typically, a delay t equal to about one-half a second is useable.

Figure 2:
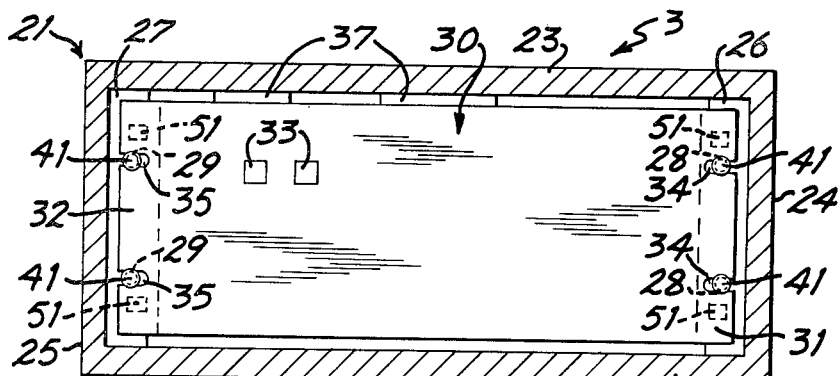
FIG. 2 illustrates the details of the keyboard of FIG. 1.

FIG. 2 illustrates in more detail, a typical keyboard system 3 in accordance with the present invention. The keyboard system 3 comprises a rectangular base or case 21 having front and rear walls 22 and 23 and side walls 24 and 25 extending therebetween. The side walls 24 and 25 include internal support ledges 26 and 27 for supporting opposing tab areas 31 and 32 formed on an electronic keyboard 30. The tab areas 31 and 32 of the keyboard 30 are provided with slots 34 and 35 which align with respective tapped holes 28 and 29 in the respective ledges 26 and 27 of the base 21. Screws 41 pass through the respective slots 34 and 35 and screw into the respective tapped holes 28 and 29 for securing the keyboard to the base.

The keyboard 30 is of frame construction and supports a plurality of keys 33 in a pressure or force actuatable manner. Actuation of the keys 33 causes activation of logic circuitry 37 supported in the base 21 adjacent the rear wall 23. A cover (not shown) sits over the frame and is provided with apertures for allowing passage of the keyboard keys therethrough. A typical keyboard system of the above type is used, for example, in the above-described model No. 700 MEGADATA electronic accessing system.

In accordance with the invention, the keyboard system 3 is further provided with pressure transducers for detecting the actuation pressure applied to the keyboard keys 33. In the illustrative case shown, transducers 51 are supported on the support ledges 26 and 27 adjacent the screw holes 28 and 29. The transducers 51 are thus held between the base 21 and the electronic keyboard 30 upon securing the keyboard to the base via screws 41. Compressional forces or pressures resulting from striking the keys 33 of the keyboard will therefore act through or compress the transducers causing them to generate electrical signals whose variations are indicative of the applied pressure.

Figure 3:
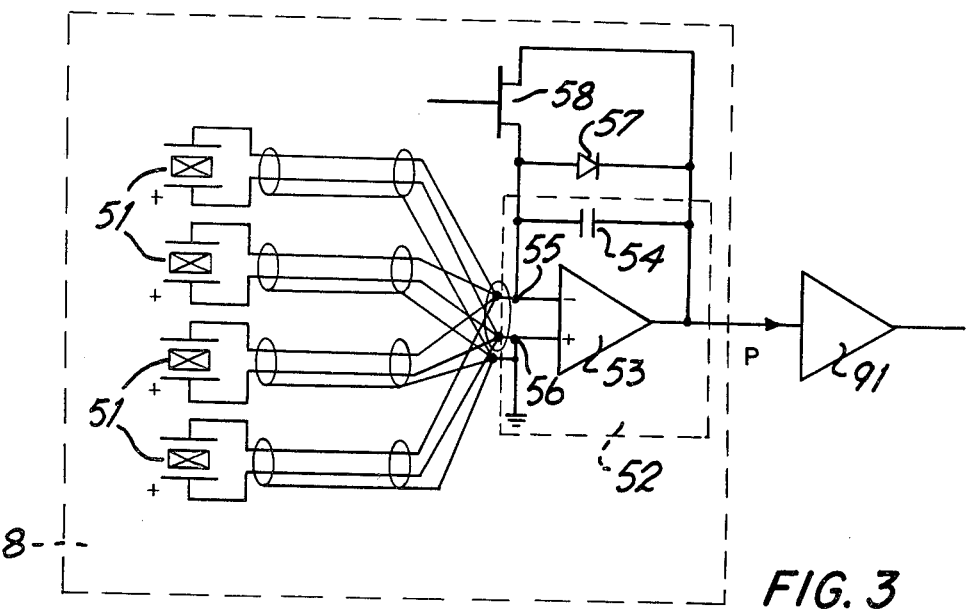
FIG. 3 illustrates the details of the transducer and converter circuits of FIG. 1.

FIG. 3 shows the transducer circuit 8 which comprises the transducers 51 and which includes further circuitry for generating the output signal P therefrom. More particularly, as shown, the charge outputs of the transducers 51 are applied in parallel to the inputs 55 and 56 of a charge amplifier 52 comprising an operational amplifier 53 and a capacitor 54. The amplifier 52 provides at its output an amplified voltage whose amplitude variation is proportional to the sum of the variations of the transducer charge outputs and, therefore, to the pressure applied to a struck key 33 of the keyboard 30. This amplified voltage forms the signal P, and is coupled to a voltage to frequency converter 91. The converter 91 forms the signal converter 9 of FIG. 1 and converts the amplified signal to a digital signal having repetitive first direction state transitions at a rate which is proportional to the amplitude variations of the amplified signal.

In the illustrative case of FIG. 3, the transducer circuit 8 is also provided with preventive means for inhibiting saturation due to long term drift. Such means is in the form of a low leakage diode 57 connected in shunt with the capacitor 54. The diode 57 carries a small bias current to the amplifier 53 inverting input 55 when the amplifier output goes negative, and thereby effectively clamps such output at a positive level. The circuit 8, in the present illustrative case, is additionally provided with means for stabilizing the circuit and shielding same from interference when a key 33 of the keyboard 30 is not in a struck condition. This means is in the form of a reset circuit comprising a low leakage field effect transistor 58 connected in parallel with the capacitor 54 and driven on whenever a key 33 of the keyboard 30 is not depressed. Typical transducers which might be used for the transducers 51 are piezo-electric type transducers having a thickness modulus ($d_{33}$) of approximately $225 \times 10^{-12}$ m/v. Alternatively, strain gauge or other type transducers might also be employed. The amplifier 53 might typically be the amplifier manufactured by Analog Devices Corporation under model number AD- 515. Similarly, the converter 91 might be a model number AD-537 converter also manufactured by Analog Devices Corporation.

Figures 4, 5:
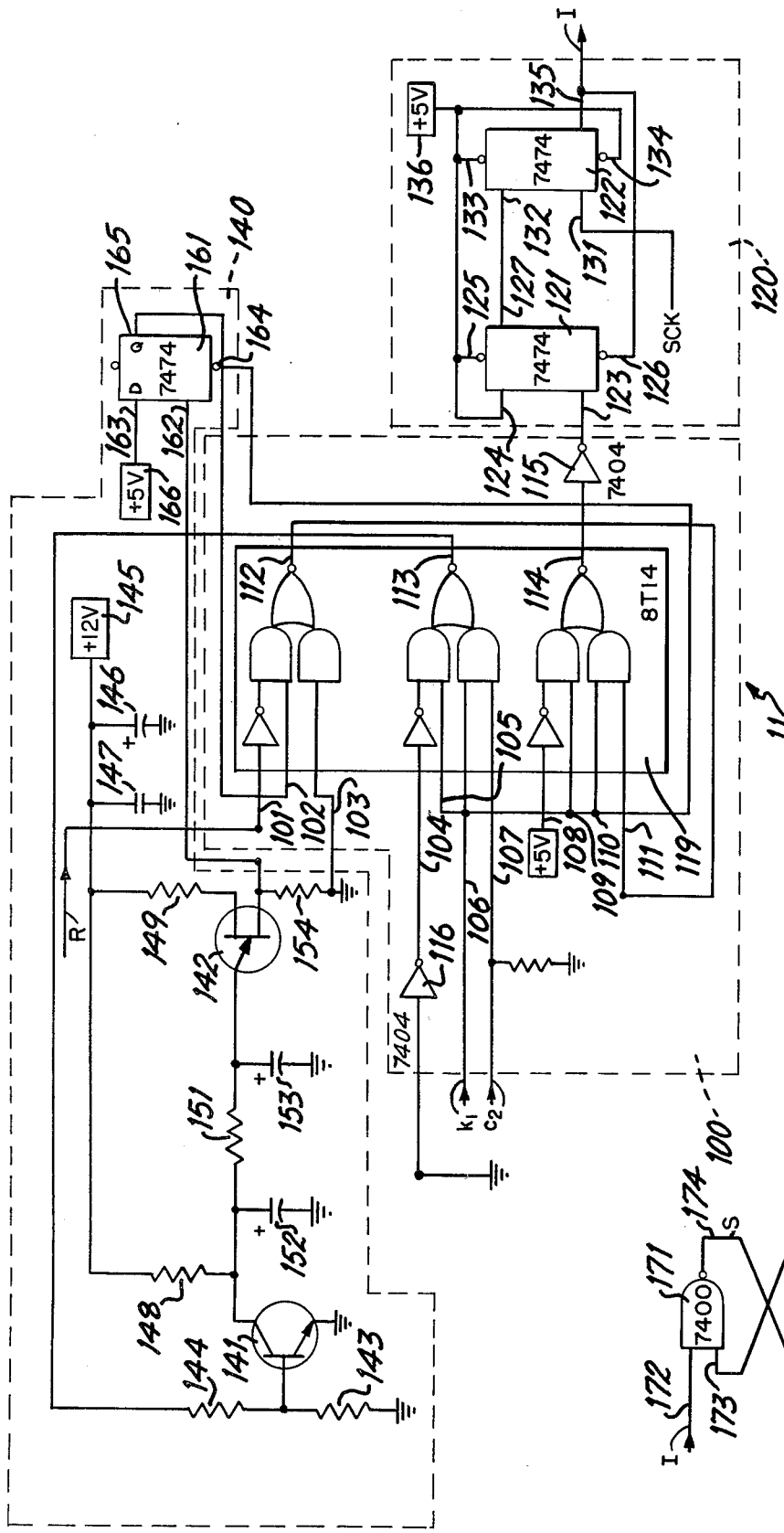
FIGS. 4 and 5 show the details of the automatic repeat circuit and the keyboard state change circuit of FIG. 1.

As above described, the repeat signal R from the converter 9 is applied to the interface circuit 11 in order to provide repetitive accessing of the indicium corresponding to a struck key. FIG. 4 shows an illustrative circuit configuration for the interface circuit 11. As shown, the circuit 11 comprises three interconnected circuit sections 100, 120 and 140. The circuit section 100 comprises a logic circuit 119, shown as an 8T14 type logic circuit, having input terminals 101-111 which correspond, respectively, to the 8T14 logic circuit pins numbered 10,11,12,3,4,5,6,14,15, 1 and 2, and output terminals 112-114 which correspond to the 8T14 logic circuit pins 9,7, and 13. The circuit 100 further comprises two inverters 115 and 116, shown as 7404 type inverters, one of which 115 is connected to the logic circuit output terminal 114 and the other of which 116 is connected to the logic circuit input terminal 104. The circuit section 100 is responsive to the keyboard output signal $k_1$ and the repeat signal R, these signals being applied to input terminals 106 and 101, respectively of the logic circuit 119. In response to these signals, the circuit 100 develops an output signal at the inverter 115 which undergoes a first direction state transition (transition from low to high) during a first direction state transition of the signal $k_1$ (when a key is depressed) and further first direction state transitions during first direction state transitions of the signal R occurring subsequent to the time interval t from the striking of a key (when automatic repeat is required for a struck key). The signal from the inverter 115, upon the occurence of the signal $k_1$ and upon the occurence and presence of the signal R beyond the interval t, will thus contain an initial first direction state transition resulting from the signal $k_1$ and further first direction state transitions repeated at the rate r resulting from the signal R.

The inverter 115 feeds the input of the circuit section 120 which is in the form of a logic circuit comprised of two interconnected flip-flop logic circuits 121 and 122, these circuits being shown as type 7474 flip-flops. The circuit 120 develops an output pulse of one state (assumed to be low) for each first direction state transition of the inverter 115 output, and, hence, will have a first pulse at the initial first direction transition corresponding to the signal $k_1$, and subsequent pulses at a rate r at subsequent first direction state transitions corresponding to the signal R. The output from the circuit 120 will thus comprise the desired interface signal I of FIG. 1.

As shown, the logic circuit 121 has input ports 123-126 and an output port 127. These ports correspond respectively to 7474 pin connections 11, 12, 10, 13 and 9. The logic circuit 122, on the other hand, has input ports 131-134 and an output port 135 which delivers the signal I. The ports 131-135 correspond to 7474 pin connections 3,2,4,1, and 6, respectively. The input ports 124,125 and 133, 134 of the two circuits are each maintained at a positive potential by 5 volts source 136. The input port 123 is fed the output of inverter 115 while the input port 132 is fed the output from port 127. A clock signal SCK at a frequency in the 1 megacycle range is fed to the input port 131.

The circuit section 140 serves as a delay circuit and prevents first direction state transitions from occurring in the inverter 115 output as a result of first direction state transitions of the signal R occurring in the predetermined time interval t. The circuit 140 comprises a grounded emitter transistor 141 and a unijunction transistor (UJT) 142. Series connected resistors 143 and 144 have their junction point connected to the base of transistor 141 and their other terminals connected to ground and output terminal 113 of logic circuit 119 respectively. A positive supply 145, shown as 12 volts, is shunted by two grounded capacitors 146 and 147 and further connects to two resistors 148 and 149 whose other terminals connect to the collector of transistor 141 and the base two of UJT 142. The collector of transistor 141 is further connected to the emitter of UJT 142 through a resistor 151. Capacitors 152 and 153 connect to opposite terminals of resistor 151 and have their other terminals grounded. The base one terminal of the UJT is connected to an input port 162 of a further 7474 logic circuit 161. The other inputs 163 and 164 of the circuit 161 are fed by a positive supply 166, shown as 5 volts, and by the signal $k_1$. The output port 165 of the circuit 161 feeds the input port 102 of the circuit 119. Ports 162-165 correspond to 7474 pins 3,2,1 and 5. The UJT base one is further connected to one terminal of a resistor 154 whose other terminal is grounded.

Operation of the interface circuit 11 to produce the signal I occurs as follows. In quiescent state, the signals $k_1$ and R are in their low states, as is the CPU signal $C_2$. For this condition, the input terminal 104 is in a high state and the input terminals 105-107 are in low states resulting in a high state for the output terminal 113. This causes the transistor 141 to be on and the UJT transistor 142 to be off. The base one of UJT 142 is therefore in a low state placing the input terminal 162 of circuit 161 in a low state. The other input 164 of circuit 161 is also in a low state due to the low state of $k_1$, rendering output terminal 165 in a low state. The three input terminals 101-103 of circuit 119 are thus in low states causing terminal 112 to be in a high state. Input terminal 111 of circuit 119 is therefore in a high state. Input terminals 110 and 109 are in a low state due to the low state of the signal $k_1$. The latter input states and the high state at the input terminal 108 cause the output terminal 114 to be in a high state, and, therefore, the output of inverter 115 to be in a low state. This low state appears at input 123 of logic circuit 120, but does not affect the output 127 which remains in its normally low state. This low state and the high states at inputs 133 and 134 result in a high state at the output 135 regardless of the state of the pulse input at terminal 131. Under this condition, the output I is high and the inputs $k_1$, $C_2$ and R are low.

Upon depressing or striking of a keyboard key, the signal $k_1$ undergoes a first direction state transition (a transition from low to high) causing the input terminals 105-106 and 109-110 to be in high states. The high state at terminal 104 maintains the high state at output terminal 113 and, therefore, transistor 141 remains on and transistor 142 remains off. Terminal 162 of circuit 161, thus, remains in a low state keeping output terminal 165 in a low state, while input terminal 164 goes to a high state due to the signal $k_1$ going high. Input terminal 102 thus remains in a low state as does input terminal 103, while input terminal 101 changes from a low to high state repetitively at the rate r due to the signal R being generated as a result of pressure being applied to the keyboard key. The low states at the inputs 102 and 103 maintain output 112 in a high state, thereby keeping input 111 in a high state. Inputs 110 and 109, however, are now also in a high state due to the signal $k_1$ going high. The output 114 thus goes to a low state causing the inverter 115 output and, therefore, the input 123 to go high. This first direction state transition (transition from low to high) of the input 123 causes the output 127 and the input 132 to go to a high state. With the input 132 in a high state the next first direction state transition of the clock signal SCK at the input 131 causes the output 135 to go to a low state which, in turn, causes the input 126 to go low. The output 127 and input 132 are, therefore, forced to low states, thereby causing the next first direction state transition of the clock to drive the output 135 high. The output 135 thus undergoes a high-low-high transition and a first pulse of low state is produced for the signal I as a result of the initial key depression forcing the signal $k_1$ high.

As above indicated, the low state pulse of the signal I causes a transition from low to high in the signal S which is detected by the CPU 4 resulting in the CPU reading the code of the depressed key from signal $k_2$ and instructing the indicia accessing unit 6 to access the indicium of the struck key. At this time, the CPU also compares the read code with its stored reference codes and if it is the same as one of the reference codes indicating the struck key is one permitting multiple access, causes the output signal $C_2$ to go to a high state. The signal $C_2$ going high causes further repetitive first direction state transitions at the rate r at the inverter 115 output and, therefore, further low state pulses at such rate for the signal I at the output 135 after the time interval t, if auto repeat is desired, i.e., if the struck key remains depressed and the signal R continues to be generated. This occurs as follows.

The high state at input 107 forces the output 113 to go to a low state, thereby turning off transistor 141 which enables capacitors 152 and 153 to charge. After the time interval t, the charging of the capacitors is sufficient to turn the UJT 142 on. Upon the UJT 142 turning on, its base one goes to a high state, thereby placing input 162 in a high state. The output 165 is thus forced to a high state causing the terminal 102 to be in the same state. If at this instant, the signal R is in a low state making the terminal 101 low, the output terminal 112 is forced to a low state as is the input terminal 111. This causes the output terminal 114 to go to a high state and the inverter 115 output to go to a low state which has no effect on the circuit 120. However, upon the signal R returning to a high state, the output terminal 112 goes to a high state as does the input terminal 111. The output terminal 114 thereupon goes low, thereby causing the inverter 115 output to go to a high state. This first direction state transition (transition from low to high) causes the circuit 120 to again provide a low state pulse at the output 135. As the signal R again goes through further first direction state transitions at the rate r the output of the inverter 115 will similarly undergo first direction state transitions at that rate. This results in the circuit 120 providing at the terminal 135 for the signal I, further low state pulses at the rate r.

As was discussed above, the state change circuit 5 responds to the signal I by undergoing a first direction state transition for each low state pulse of the signal. Moreover, after each such transition it is returned to its low state by the signal $C_1$ of the CPU 4. As shown in FIG. 5, the circuit 5 comprises a flip-flop logic circuit including two interconnected nand gates 171 and 180. These gates have respective input terminals 172,173 and 181,182,183 and respective output terminals 174 and 184 and are illustrated as 7400 and 7410 type gates in FIG. 5. The terminals 172, 173 and 174 correspond to pins 9, 10 and 8 of the 7400 type gate and terminals 181–184 correspond to pins 13, 2, 1 and 12 of the 7410 type gate. The signal I feeds the terminal 172, while the signal $C_1$ the terminal 183. The signal S appears at the terminal 174.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention. Thus, for example, instead of utilizing the above-described transducer configuration, other configurations adapted to ensure transducer response to the keyboard keys might be used. In particular, individual transducers might be directly affixed to respective individual keys. Furthermore, only keys desired to provide automatic repeat might be provided with a respective transducer. This would enable elimination of the CPU 4 having to determine whether a key is one for which automatic repeat is allowable.

What is claimed is:

1. Apparatus comprising in combination a keyboard system including a plurality of pressure actuatable keys, means including a transducer circuit and being responsive to the actuating pressure applied to any one of a number of said keys for generating an output signal having an amplitude related to said actuating pressure as applied to the actuated one of said number of keys, means responsive to actuation of all of said keys for accessing indicia corresponding to the actuated key, and a repeat circuit including said actuating pressure responsive means and having a converter circuit coupled to said last mentioned means for converting said output signal into a repeat signal during continued actuation of said one of said number of keys, said repeat signal undergoing repetitive state transition at a rate related to said amplitude of the output signal, and said means for accessing indicia further responds to said repeat signal by repetitively accessing the indicium corresponding to said one of said number of keys.

2. Apparatus in accordance with claim 1 wherein:
said keyboard system further comprises:
means for generating first and second signals upon actuation of any of the said keys, said first signal being indicative that a key has been actuated and said second signal being indicative of the actuated key;
said indicia accessing means further comprises:
an accessing unit for accessing said indicia;
a central processing unit responsive to said first and second signals and to said repeat signal for instructing said accessing unit to access the indicium corresponding to the key indicated by said second signal and to, thereafter, repetitively access the indicium corresponding to the key indicated by said second signal at a rate corresponding to the rate of state transition of said repeat signal.

3. Apparatus in accordance with claim 2 wherein:
said first signal undergoes state transition upon actuation of any one of said number of keys;
said repeat circuit comprises:
a logic interface circuit responsive to said first signal and to said repeat signal for generating a further signal having a pulse at said state transition of said first signal and further pulses thereafter at state transitions of one direction of said repeat signal;
said indicia accessing means further comprises:

a logic circuit responsive to said output of said interface circuit and having an output signal of one state upon the occurence of each of said pulses of said output of said interface circuit;

and said central processing unit is responsive to the output of said logic unit and instructs said accessing unit to access an indicium each time said output of said logic circuit is in said one state.

4. Apparatus in accordance with claim 3 wherein: said repeat circuit further comprises means for delaying said logic interface circuit from generating output pulses in response to said repeat signal for a predetermined time interval from the actuation of any one of said number of keys.

5. Apparatus in accordance with claim 3 wherein: said central processing unit causes said logic circuit to take on a second state upon instructing said accessing unit to access an indicium.

6. Apparatus in accordance with claim 3 wherein: said central processing unit upon instructing said accessing unit to access an indicium in response to said first signal determines whether the key corresponding to said accessed indicium is allowed to have its corresponding indicium accessed repetitively and generates a signal of one or the other state if repetitive access is or is not allowable;

and said logic interface circuit responsive to said signal from said central processing unit produces and fails to produce output pulses in response to said repeat signal when said signal from said central processing unit is in said one or other state, respectively.

7. Apparatus in accordance with claim 6 wherein: said transducer circuit comprises:

a piezo-electric transducer responsive to the actuating pressure applied to said keys;

and a charge amplifier for receiving the output of said transducer;

and said converter circuit comprises an analog-to-digital converter.

8. Apparatus comprising in combination a keyboard system including a plurality of pressure actuatable keys, means responsive to the actuating pressure applied to any one of a number of said keys for generating an output signal having an amplitude related to said actuating pressure as applied to the actuated one of said number of keys, means responsive to actuation of all of said keys for accessing indicia corresponding to the actuated key, and a repeat circuit including said actuating pressure responsive means for generating during continued actuation of said one of said number of keys a digital repeat signal from said output signal which digital signal undergoes repetitive state transition at a rate related to said amplitude of the output signal, and said means for accessing indicia further responds to said repeat signal by repetitively accessing the indicium corresponding to said one of said number of keys.

* * * * *